United States Patent [19]
Turner et al.

[11] 3,713,846
[45] Jan. 30, 1973

[54] METHOD FOR COOKING MEAT PRODUCTS

[75] Inventors: William J. Turner, Oak Lawn; Wayne E. Henry, Downers Grove; Gary W. Hubb, Western Springs, all of Ill.

[73] Assignee: The Griffith Laboratories, Inc., Chicago, Ill.

[22] Filed: Aug. 26, 1970

[21] Appl. No.: 67,174

Related U.S. Application Data

[60] Division of Ser. No. 864,463, Oct. 7, 1969, Pat. No. 3,559,564, which is a continuation-in-part of Ser. No. 701,442, Jan. 29, 1968, abandoned.

[52] U.S. Cl. ................99/107, 99/109, 99/217, 99/441, 99/443 C
[51] Int. Cl. ....A22c 11/00, A22c 18/00, B65b 55/02
[58] Field of Search....99/1, 107, 109, 217, 229, 331, 99/389, 441, 443 C; 219/410, 441

[56] References Cited

UNITED STATES PATENTS

| | | | |
|---|---|---|---|
| 2,475,408 | 7/1949 | Smelzer | 99/107 |
| 3,091,172 | 5/1963 | Wildemann | 99/109 X |

FOREIGN PATENTS OR APPLICATIONS

| | | | |
|---|---|---|---|
| 867,920 | 5/1961 | Great Britain | 99/107 |

Primary Examiner—Hyman Lord
Attorney—Merriam, Marshall, Shapiro & Klose

[57] ABSTRACT

Methods and apparatus for cooking meat products confined in casings which utilize the application of controlled intense infrared radiation. In the cooking process an intense infrared radiation source heating the product is impulsed by rapidly turning the source on and off in a cyclic manner. This enables a commercially good product to be obtained in significantly less time than is normally required in the prior art.

6 Claims, 7 Drawing Figures

PATENTED JAN 30 1973

INVENTORS
William J. Turner
Wayne E. Henry
Gary W. Hubb

Merriam, Marshall,
Shapiro & Klose     ATTYS.

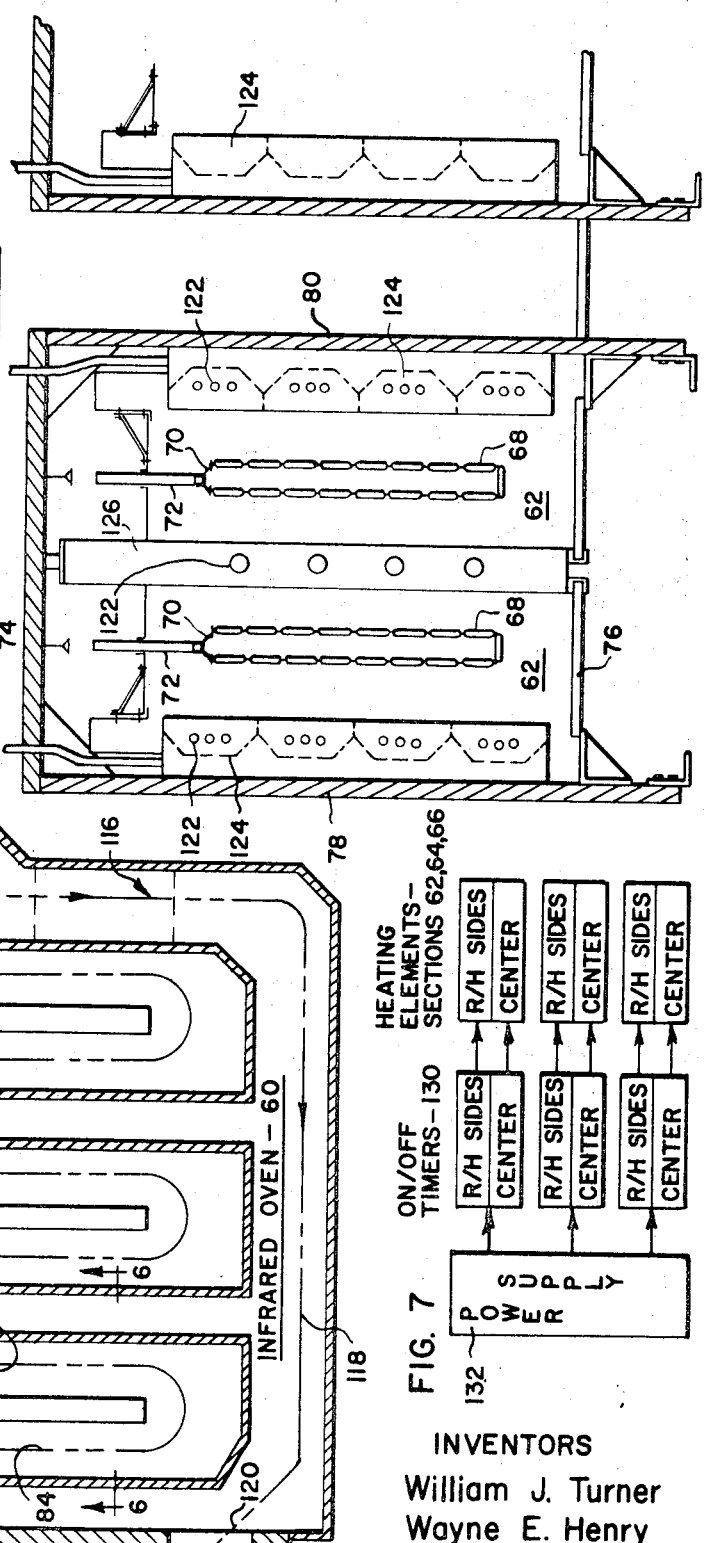

METHOD FOR COOKING MEAT PRODUCTS

This is a divisional application of a copending application, "Methods and Apparatus for Cooking Meat Products" U. S. Ser. No. 864,463, filed Oct. 7, 1969, now U.S. Pat. No. 3,559,564 issued Feb. 2, 1971 which in turn is a continuation-in-part application of U. S. Ser. No. 701,442, filed Jan. 29, 1968, now abandoned.

FIELD OF THE INVENTION

This invention relates to the cooking of food with infrared energy, and more particularly to methods and apparatus for cooking fresh or cured meat products and smoked meat products. The teachings of this invention are particularly useful for cooking food material confined in casings.

DESCRIPTION OF THE PRIOR ART

Infrared radiant energy has been previously described as a desirable source of clean and intense heat for the rapid heating of precooked frozen food such as sandwiches, frankfurters, etc., and as an example one may refer to U.S. Pat. Nos. 3,265,861; 3,131,280; 3,108,173; and 2,764,664 (also reissue U.S. Pat. No. Re. 24,296). There are also a number of other patents which can be cited as an example of techniques for using infrared radiation in the cooking of fish, for example German Pat. Nos. 1,066,081 and 1,085,406; for cooking hams U.S. Pat. No. 2,980,554; for cooking bacon U.S. Pat. No. 3,288,054; for smoking frankfurters U.S. Pat. No. 2,844,478; and for baking bread U.S. Pat. No. 3,249,741.

While some of the above mentioned patents indicate the desirability of cooking with infrared radiation to reduce the cooking time, it is to be noted that none of this prior art provides a practical commercial system using intense infrared radiation for the cooking of meat products which are confined in a natural or artificial casing, such as sausages of various types—bologna, frankfurters, rolled poultry products, etc. The cooking of bologna and frankfurters in a short period of time with intense or high wattage infrared heat in order to obtain significant benefits over presently utilized smokehouse operations presents problems considered insurmountable.

In smokehouses heretofore used for the cooking and smoking of meat products in casings—such as bologna, frankfurters, and the like, the product is heated by contact with heated air. The casing products are normally heated to have an internal temperature in the required range of 152° to 165° F. for pasteurization to be obtained. For bologna, the normal time required to reach the desired temperature using present available smokehouses is about 7-10 hours with 8-12 percent product shrinkage, whereas for frankfurters, the normal cooking period is about 1-2½ hours with 8-15 percent product shrinkage.

In attempts at cooking casing products in a desirable shorter period of time using intense infrared radiation in accordance with prior art techniques for infrared cooking, many problems such as burst casings, emulsion breakdown, and proper surface skin formation, and cure development were encountered. As an example, rapid heating of the product by infrared radiation developed a high internal pressure due to the expansion of air released within the casing, resulting in the rupture or bursting of the casing itself. Although a certain percentage of burst casings is obtained even in smokehouse operations due to casing flaws, improper stuffing or formulations, etc., an abnormal bursting percentage was obtained using intense infrared energy as the heat source with previously known cooking apparatus and processes. Also, a rapid build-up of external and/or internal temperatures due to the application of intense infrared radiation melts or renders and separates the fat from the lean meat, that is, breaks down the emulsion, thereby causing an unacceptable commercial product. Another problem which was encountered with the application of intense infrared radiation was the development of a surface crust which restricts both the escape of moisture and air from within the casing during the heating process and can eventually result in the rupturing of the casing or an emulsion break down. If a less intense infrared energy source is used in an attempt to alleviate somewhat the aforementioned problems, a longer cooking time is required, thereby merely exchanging problems and practically eliminating the significant rapid cooking advantage afforded by the intense infrared radiation.

Therefore, in order to obtain the benefits of a much shorter cooking time using intense infrared radiation, as opposed to the presently used smokehouses without infrared radiation, the prior art infrared cooking devices and methods fail to meet the following desired requirements when cooking casing products;

1. Prevent bursting of the casing or at least maintain a bursting percentage similar to smokehouse operations which do not use infrared radiation;
2. Prevent melting or rendering of the fat which causes the emulsion or product to separate and break down;
3. Cook the casing product and control the amount of moisture escaping during the cooking operation to provide a minimum of product shrinkage;
4. Provide a skin during the cooking operation to aid in peeling artificial casing products;
5. To reinforce the casing by properly forming a skin during cooking so the combination of the casing and formed skin can withstand higher internal pressures than the casing alone;
6. Cook the center of the product to at least 152° F. for pasteurization, and in order to assure color stability and maximum cure development.

SUMMARY OF THE INVENTION

In accordance with the principles of the present invention there is provided apparatus and methods for the cooking of meat products by the application of controlled intense impulse infrared heat. It has been found that the strict requirements recited above for infrared cooking of confined meat products can be most advantageously met by insuring a balanced phasing of the inside vs. outside surface temperatures, which in one aspect of the invention is provided by rapid on and off or high and low heat impulsing of the intense infrared radiation applied during the cooking process. It is believed that cycling or repeating of the infrared radiation brought forth by rapid on and off or high and low heat impulsing to the surface of the meat product prevents excessive surface temperatures, and yet enables the desired inside temperature at the center of the product to be obtained to provide a commercially good product. Apparently the surface temperature of the product cools rapidly during the off or low heat period. The heat which has penetrated into the interior of the product remains for a greater period of time so that the temperature of the inside of the product does not vary appreciably during the off or low period, and in fact rises slightly during this period. Therefore, during the off or low period, the heat and corresponding temperature inside the product is allowed to equalize or be in phase with the temperature on the outer meat surface, so that the product is always at a temperature below the fat melting point thus preventing any appreciable amount of fat rendering.

In accordance with one aspect of the invention, with particular advantages in the continuous cooking of casing products, a lower average heat level is applied to a casing product for a predetermined heating period while maintaining the inner and outer surface temperatures balanced and at temperatures below the fat melting point, and thereafter a higher average heat level is applied while again maintaining the inner and outer surface temperatures balanced until the product is fully cooked. Using this controlled low average - high average heating sequence, it has been found that commercially acceptable casing products can be rapidly cooked without the difficulties of the prior art. Utilizing the principles of this aspect of the invention, frankfurters can be fully cooked in less than 20 minutes in a continuous type cooking process.

As an example of cooking other casing products, it has been found that a source of continuous infrared radiation repeatedly applied to bologna in periods of about 5 seconds, separated by intervals of non-application of about 10 seconds, can cook the bologna in slightly more than 3 hours with about 5 percent shrinkage. In this example, the impulsing heat application was obtained by rapidly turning on the intense infrared heat source for about 5 seconds and then rapidly switching the source off for about 10 seconds, while the bologna was being rotated. This cooking cycle was repeated for the entire cooking period.

It is especially advisable to rotate the product, particularly when cooking products with diameters greater than about 2 inches. Rotation is desirable for uniform heating of the product and prevents undesired localized heating.

It must be understood that the term "impulse" or "on and off (high and low) radiation heat impulsing" or the like, as used herein refers to a rapid application of the heat source for a desired period of time, followed by a rapid non-application of the heat source (or a rapid application of a relatively lower amplitude heat source) for another period of time.

BRIEF DESCRIPTION OF THE DRAWINGS

FIG. 5 is a schematic illustration of a plan view of the three stage infrared oven for the continuous cooking of casing products in accordance with one aspect of the present invention;

FIG. 6 is a partial sectional view taken along section line VI—VI of the three stage oven shown in FIG. 5, illustrating the construction details of the first oven stage; and FIG. 7 is a schematic illustration of the cooking cycle timing apparatus utilized for selectively controlling the heating elements in respective oven stages to apply a higher average heating level in the second and third oven stages as compared to a lower average heating level in the first oven stage.

DESCRIPTION OF THE PREFERRED EMBODIMENTS

Figure 1:
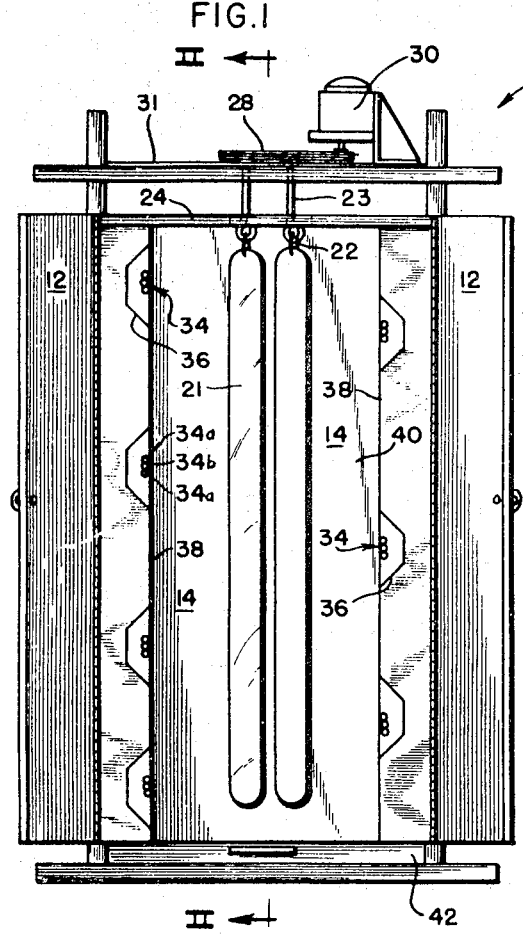
FIG. 1 is a front elevational view illustrating an infrared cooking oven constructed in accordance with the principles of the present invention and especially useful as one illustrative example of procedures and apparatus which may be used in the infrared cooking of bologna.
Figure 2:
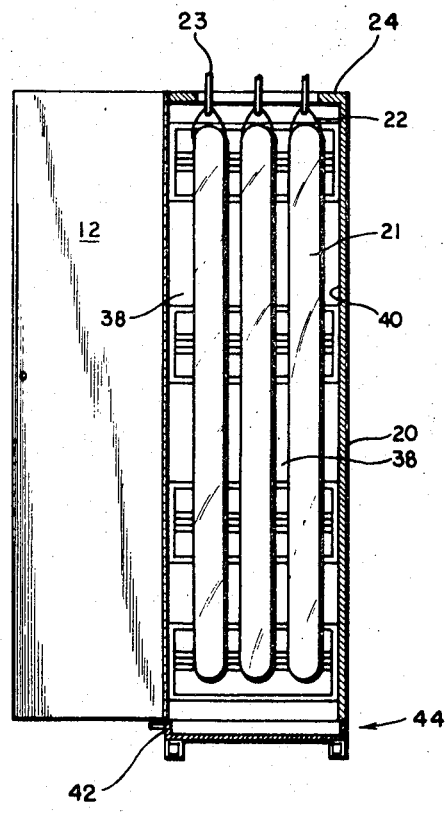
FIG. 2 is a side elevational view taken along section line II—II of FIG. 1 illustrating a preferred spacing of the infrared lamps mounted along one side of the oven.
Figure 3:
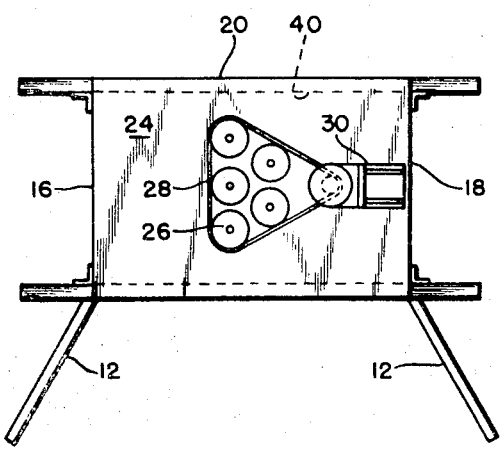
FIG. 3 is a plan view of the oven illustrated in FIG. 1 to indicate apparatus for rotating the bologna within the oven.

Referring to FIG. 1, there is illustrated an infrared cooking oven or heating cabinet 10 which is one illustrative example of apparatus capable of performing the method of this invention. While the drawing illustrates the infrared cooking of bologna and frankfurters, it is to be understood that such illustration is merely an example of the impulse application of infrared heat to cook casing products.

In the view shown in FIG. 1, the doors 12 on each side of the oven have been opened in order that the details of the interior 14 of the oven can be seen. As illustrated in the drawing, the oven frame includes side walls 16 and 18, back wall 20, and the necessary structure such as flanges and corner joints for interconnecting the side walls to the back wall and thereby solidifying the frame.

The casing products which are to be cooked in the oven 10, such as bologna 21, are hung by loops 22 from respective hooks 23, the hooks projecting through the top plate 24 into the interior 14 of the oven 10. The hooks 23 are connected to respective sprockets 26 so as to be rotated thereby by the rotating drive supplied by a belt 28 operatively associated with each of the sprockets 26 and a motor 30. A support plate 31 is suitably mounted to the frame for supporting the drive motor and sprockets thereon.

Referring specifically to FIG. 1, it can be seen that a series of infrared lamp assemblies 34 and suitable respective reflectors 36 for each lamp is suitably spacially mounted from the oven side walls 16 and 18. In the embodiment of FIG. 1, each of the infrared lamp assemblies 34 comprises a pair of outer 550 watt quartz tubes 34a and a center 1,600 watt lamp 34b. In practice the lamps 34a and 34b can be operated individually or in various combinations. The lamps 34 are mounted in the oven 10 such that there is greater distance between the lamps at the upper portion of the oven than there is at the bottom portion. This provides a more uniform distribution of heat within the oven as developed by the lamps 34, since the mounting arrangement shown in FIG. 1 compensates somewhat for the eventual rising of the hot air towards the oven upper portion. However, it is to be understood that the positioning of the lamps/tubes is determined by the individual diameter of the product to be cooked in the oven. For example, in cooking frankfurters of about one inch diameter, an equal spacing of the lamps/tubes has been found satisfactory. The reflectors 36 can be formed of any suitable reflecting surface such as gold plate, aluminum or other material well known in the art.

In order to provide the most efficient use of the heat developed by the lamps 34, it is preferred that the remaining inner surfaces of the oven 10 also be formed of highly heat-reflective material. Therefore, the surfaces 38 between each of the lamps, the inside surface 40 of the back wall 20, and the inside portions of the doors 12, should be provided with a highly heat reflecting surface. For convenience, a collecting drip pan 42 is adapted so as to slide in and out of the bottom portion 44 of the oven 10. During the cooking of the bologna, the drippings from the bologna fall into the pan 42 and are collected therein. The electrical connections and a suitable electrical power supply for operating the infrared lamps 34 are well known and can be readily supplied.

Figure 4:
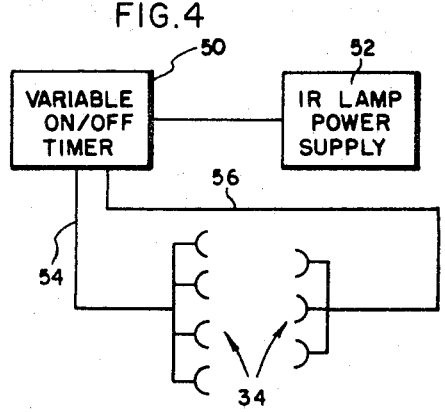
FIG. 4 is a schematic illustration of the cooking cycle timing apparatus utilized for providing the cyclical impulsing on and off application of intense infrared radiation to the products within the oven in accordance with the principles of the present invention.

Referring to FIG. 4, there is illustrated one example of means for cycling the intense infrared radiation source heating the product. It is to be understood, of course, that any suitable means for control of the application of electrical power to the infrared lamps can be utilized. One example, as shown in FIG. 4, provides an adjustable timer circuit 50 which controls the application of electrical power from a suitable power supply source 52 to the infrared lamps via connecting lines 54 and 56. The connecting lines 54 and 56 are coupled to each individual lamp assembly, such as the infrared lamp assemblies 34. The timer 50 can be any device well known in the art for switching electrical power to the individual infrared lamps on and off or between high and low levels, in accordance with an adjustable preset timing mechanism. The timer circuit 50 enables the desired cycling time between the lamp on and off (or high and low) periods to be preset to enable the correct cycle to be obtained for the particular casing product in the oven. As illustrated in the examples of the description herein, the preferred on/off times varies with the type of product involved.

The illustrated oven 10 can be used for cooking of any casing-type product, such as bologna, frankfurters, chicken and other poultry products which are stuffed into casings. As mentioned previously, the problems encountered when attempting to cook casing products such as bologna with intense infrared heat were related to the fact that the product was contained within a casing. In solving such problems with the apparatus and method of the present invention, it has been found that by a cycling or repeating application of intense infrared radiation from the high wattage lamps 34, such problems have been substantially eliminated. One of the ways in which this cycling of the infrared heat has been accomplished is to turn on or supply electrical power to the lamps 34 such that they are radiating for a selected period of time, and thereafter cycling the lamps between off (or low heat level) and on (or high heat level) conditions. When cooking bologna in such a fashion, as will be more specifically detailed in specific examples hereinafter, a cooking cycle of 5 seconds on followed by ten seconds off was found to be suitable for a non-vacuumized emulsion. This same cooking cycle of 5 seconds on, 10 seconds off, 5 seconds on, 10 seconds off, etc. was also found to be suitable for the cooking of chicken rolls and wieners in casings and frankfurters. For smaller sized products, such as frankfurters, a greater ratio of on to off time can be more advantageously utilized. In cooking bologna and chicken rolls, the product was rotated continuously in order to maintain a uniform application of heat. However, in the smaller diameter products (frankfurters, chicken wieners, etc.) we have found that rotation of the product is not required.

As an example of the problems encountered with the continuous application of infrared heat or even with an incorrect heat cycling interval, a bursting or exploding of the bologna occurred within 2½ hours and before the bologna was cooked, when attempting to cook bologna with the 1,600 watt lamps 34b turned on for 5 second intervals and off for 5 second intervals. The burst casing was believed to be caused by the rapid expansion of the casing product due to steam buildup and trapped air within the casing. Furthermore, the surface temperature in this example exceeded 200° F., and was increasing gradually, thereby developing undesirable case hardening as well as emulsion breakdown.

The method aspect of this invention can be most clearly seen by referring to the following examples in which actual cooking operations for bologna, chicken rolls, and frankfurters or wieners are detailed. In two of the following examples, the emulsion was vacuumized before stuffing into the casings, and this procedure appeared to further reduce the required cooking time.

The examples below were performed with an apparatus as shown in FIGS. 1–4 and as described hereinabove, with the following particulars related to the oven apparatus per se. The approximate overall dimensions of the oven or heating cabinet 10 was 77 inches high, 45 inches wide (between side walls 16 and 18), and 19½ inches deep. The distance between the lamp assemblies 34 and each of the side walls 16 and 18 was approximately 27 inches. In the following examples of this section, the preferred increasing spacing of the lamps from the bottom to the top of the heat cabinet was not utilized, and instead four lamp assemblies were approximately evenly spaced on one side wall and three lamp assemblies on the opposite side wall. The lamp assemblies were approximately 11 inches wide and were staggered in placement on the side walls 16 and 18 so that each lamp assembly radiated towards a reflecting surface 38 on the opposite side wall, and not directly into a lamp assembly on the other wall. Each lamp 34b provided 1,600 watts of heating, and the timer 50 was set to simultaneously and cyclically turn the high wattage lamps 34b on and off for the respective time periods described in the following examples.

EXAMPLE A

Infrared Cooking of Bologna

A typical bologna formula in the industry, having 26–27 percent fat, 12 percent protein and 55 percent moisture, was utilized in this example. A jumbo bologna 4½ inches in diameter, 52 inches in length and 25 pounds in weight was prepared by pregrinding the meat and mixing in the seasoning, other ingredients and natural liquid smoke flavoring in a silent cutter and thereafter passing the meat through the Mince Master to form a more stable emulsion. The emulsion was then placed in a conventional stuffer and stuffed. The above procedures were performed in accordance with standard industry procedures.

After stuffing, the bologna was placed in the oven in a vertical position and rotated at 10 revolutions per minute during the cooking cycle. The timer controlling the application of electrical power to the seven high intensity (1,600 watt) infrared lamps was set so that the lamps were simultaneously operated on a 5 seconds on and 10 seconds off cyclical impulsing manner. The doors 12 of the oven were, of course, closed during the cooking operation.

Electrical power was only supplied to the higher wattage lamps 34b, and in an impulsed manner such that the lamps 34b were all rapidly turned on during the 5 seconds on cycle, and were all rapidly turned off for the 10 seconds off portion of the cycle. Thus, there was a distinct temperature difference on the surface of the bologna during the on portion of the cycle as opposed to the off portion of the cycle. The internal temperature of the bologna was between 150°-160° in approximately 3¼ hours at the end of the infrared heating cycle.

After cooking, the bologna was removed and steamed in a steam cabinet for approximately 3-7 minutes to enhance peeling of the cellulose casing.

The bologna was thereafter chilled by an ice water shower and was placed in a storage or holding cooler. An excellent product was obtained with a yield of about 95 percent.

EXAMPLE B

Infrared Cooking of Chicken Rolls

The following typical chicken roll formula was utilized in this example:

Meat, raw (white, 52.5%; dark 47.5% by weight);
Skin, raw (11.2% of meat weight);
Soy, protein concentrate (3.5% meat and skin weight);
Moisture (5% of meat and skin weight);
Spices and phosphate.

The chicken white and dark meat and the skin was preground and blended with the spices and other ingredients in a mixer. The product was then stuffed into a fibrous casing and hung in the oven and rotated at 10 revolutions per minute. Only the eight 1,600 watt lamps 34b were utilized during the cooking cycle. A 5 seconds on, 10 seconds off cooking cycle was utilized, the same as that used for the bologna cooking cycle. The chicken rolls stuffed in a No. 7 fibrous casing (about 4¼ inches diameter) were cooked to an internal temperature of 160° in 3 hours; while those stuffed in No. 2½ fibrous casings (about 2 inches diameter) reached the same internal temperature in 1½ hours.

The cooked chicken rolls were removed from the oven and chilled in a water shower.

The rolls had excellent peelability, color, flavor, eye appeal, and were completely absent of any noticable moisture, fat or jelly pockets. The average yield was 92.5 percent. In summary, the product obtained were excellent.

EXAMPLE C

Infrared Cooking of Chicken Wieners

The following typical chicken wiener formula was used in this example:

Meat, raw (white, 57.5%; dark, 42.5% by weight);
Skin, raw (22% of meat weight);
Soy protein concentrate (3.5% meat and skin weight);
Water (15% meat and skin weight);
Spices and phosphate.

The chicken white and dark meat was preground and thereafter mixed with the seasoning and other ingredients, passed through a Mince Master, and stuffed into a No. 25 fibrous casing (about 1 inch diameter).

The cooking operation was exactly the same as that for the chicken rolls except the wieners were not rotated. The chicken wieners reached an internal temperature of 160° in 30 minutes, and the product was then removed and showered until the internal temperature was 110° F. An average product yield of 92.5 percent was obtained. As in the case of chicken rolls, the cooked chicken wieners were an excellent product.

EXAMPLE D

Infrared Cooking of Bologna—Vacuumized Emulsion

The typical bologna formula given in Example A was used in this example. The meat, moisture, spices and natural liquid smoke flavoring were chopped together for approximately 4-5 minutes. From the chopper the emulsion was put through the Mince Master, then placed under vacuum for approximately 3 minutes. A 25-29 inch vacuum was used. The vacuumizing removes the air from the emulsion so as to lessen the possibility of casing burst from the expansion of trapped gases in the emulsion, therefore enabling the product to be cooked faster. After vacuumizing, the emulsion was stuffed in No. 7 casings (about 1¼ inches diameter).

The bologna was then placed in an infrared oven and rotated at 10 RPM throughout the cooking cycle. The high intensity (1,600 watt) infrared lamps were used and the lamps were rapidly cycled on for five seconds and off for 7 seconds. The measured surface temperature during the cooking process never exceeded 195° F., and after 2½ hours the internal temperature of the bologna had reached the desired cooked temperature of 152°.

Thereafter the bologna was steamed for 3-5 minutes and then showered until the internal temperature had fallen to between 100°-110° F. The product was then placed in 38° F. for storage. The product obtained by this process had excellent flavor, color and color stability when samples were placed under simulated retail conditions for a period of 10 days.

EXAMPLE E

Infrared Cooking of Frankfurters—Vacuumized Emulsion

The same formula that was used for the bologna described in Example D was also used for the frankfurters in this example. Normally, the frankfurter formulation would be slightly different than the bologna. The frankfurter formulation would normally contain slightly more water and would perhaps have a slightly higher fat content than in the previously described bologna formulation.

In this example, the frankfurters were stuffed in No. 26 casings (about 1 inch diameter) linked into about 6–8 inch links. The product was then placed in the infrared oven and without rotation was finished to an internal temperature of 165° F. in approximately 12 minutes. The high intensity (1,600 watt) infrared lamps were used with an impulsing cycle of 20 seconds on, 10 seconds off. The finished product had very good color and the flavor was of a high quality product.

Referring now to FIGS. 5, 6 and 7, there is illustrated a three stage infrared oven for cooking casing products on a continuous rather than a batch process. While the following description pertains to the use of the apparatus illustrated in FIGS. 5–7 in connection with the cooking of frankfurters, it is to be understood that the same or modified apparatus can be applied to the cooking of other types of casing products. For convenience in illustrating one feature of this aspect of the invention wherein the frankfurters are cooked in three controlled infrared heat sections, the actual frankfurter path through the oven has been shown in dashed lines in the plan view of FIG. 5, and the position of the heating elements is not shown. The heating elements are shown in the partial sectional elevational view of FIG. 6.

The three stage infrared oven 60 generally includes infrared tube oven section 62, and infrared lamp oven sections 64 and 66. The frankfurter links 68 are mounted by suitable hook means 70 to apparatus 72 for moving the frankfurters through the three oven sections. Each oven section 62, 64 and 66 is bounded by enclosure walls such as top wall 74, bottom wall 76 and side walls 78 and 80.

After being hung on suitable hanging apparatus 72, the frankfurters are subjected to an acid spray at about 110°–120° and thereafter enter inlet 82 at the entrance of infrared tube oven 62. The frankfurters travel along conveyor line 84, and are reversed along conveyor line 86 to the outlet 88 of tube oven 62. Similar entrances and reversals in infrared lamp oven 64 and 66 are provided with the frankfurters exiting at outlet port 90.

At inlet port 92 the frankfurters enter a heated dwell zone 94 indicated generally along conveyor line 96 extending from inlet port 92 to the turn-around conveyor section 98 where the suspended frankfurters are reversed and are subjected to a hot water spray along conveyor 100 for final cooking and aids in peeling of frankfurters. From inlet port 102 through conveyor lines 104, 106, 108 and 110 the frankfurters are subjected to a brine chill where the internal temperature of the frankfurters is reduced. The suspended frankfurters exit from the brine chill area 112 at outlet port 114 and subsequently pass through a tap water spray area 116 to remove the salt brine from the frankfurters and from the hanging apparatus 70, 72, the frankfurters thereafter travel along conveyor line 118 to exit from outlet port 120 to the peeling area.

In utilizing the infrared impulse heating principles of the present invention, it has been found advantageous to employ, in accordance with this aspect of the invention, three controlled infrared heating sections 62, 64 and 66. As is shown in detail in FIG. 6, the first heating section 62 is a low infrared heat section with two reflector/heat sides comprising infrared tubes 122 and reflectors 124 mounted along side wall 78 adjacent conveyor line 84 and along side wall 80 adjacent conveyor line 86; and a center heat portion comprising infrared tubes 122 suitably mounted in a frame 126. Such infrared tubes are well-known devices as indicated previously which maintain a temperature output of approximately 2,000° F. at full voltage.

The frankfurters thus are conveyed on conveyor line 84 between the center heat section and one reflector/heat side, around the center section, and between the center heat section and the other reflector/heat side to outlet port 88. When the frankfurters exit at outlet port 88 from the low heat section 62, the internal temperature of the frankfurters is approximately 110°–120° F. A controlled impulse infrared heating cycle is utilized to insure—during the initial cooking period—the proper equalization of the frankfurter inside temperature with respect to and in phase with the outer skin or surface temperature, to prevent emulsion or product break down, casing bursts, and the numerous problems indicated previously.

In controlled infrared heating sections 64 and 66 conventional infrared tubes 122 were utilized which provided a heating output temperature of approximately 4,200° F. at full voltage. The infrared tubes 122 in heating sections 64 and 66 are similarly mounted in reflector/heat sides and an intermediate center heat portion as in heating section 62.

It has been found that once the frankfurters have been subjected to a lower average heat level over a predetermined initial heating period during which the frankfurter inside and outside temperatures are maintained in phase (below the fat melting point to prevent any appreciable amount of rendered fat), the frankfurters can thereafter be subjected to the higher temperature of infrared tubes 122 during controlled impulse heating with higher average heat levels in sections 64 and 66 until the required fully cooked frankfurter internal temperature is reached. The frankfurters exit at outlet port 90 of heating section 66 with an internal temperature of approximately 145°–170°, depending on the product formulation.

As schematically illustrated in FIG. 7, the reflector/heat sides and center heat portions in each heating section 62, 64 and 66 is controlled by respective timers 130 controlling the application of power from power supply 132 to the infrared lamps or tubes therein.

The following examples were performed with an infrared heating oven and associated apparatus, as shown in FIGS. 5–7 and as described hereinabove, with the following particulars related to the oven apparatus per se. Each infrared heating section 62, 64 and 66 was approximately 7 feet high (about 5 feet between top wall 74 and bottom wall 76), 4½ feet wide (between side walls 78 and 80), and approximately 19 feet long.

Suitable switching and timing apparatus as illustrated schematically in FIG. 7 was provided to switch the infrared tubes 122 and tubes 122 in respective heating sections between their respective on and off conditions.

EXAMPLE F

Three-Stage Infrared Cooking of Frankfurters

Except for a lower moisture content, the standard frankfurter formula in the industry, having 30 percent fat, 11½ percent protein was utilized in this example. Since one of the features of the present invention as will be described more particularly hereinafter is that there is less shrinkage in the final product (about 2–5 percent) than in the previously utilized smoke cooking of frankfurters (about 10–12 percent), the frankfurter formula contained about 28 percent less moisture.

In this example the frankfurters were stuffed in No. 25 casings (about 1 inch diameter), linked into about 5 inch links with the ends attached to the end hooks 70 of hanging apparatus 72. The product entered an acid spray section (110°–120° F.) and the internal frankfurter temperature out of this section was about 80° F. Next, the frankfurters entered the low heat infrared tube section 62 (2,200° F.) and traveled along conveyor line 84, 86 through the high heat infrared lamp sections 64 and 66 (4,200° F.) and out exit port 90.

The following cooking cycles were utilized in the respective heating sections 62, 64, 66 with R denoting the reflector/heat sides and C the center heat portion in each oven section.

INFRARED OVEN - COOKING CYCLES

| Section 62 Tubes | Section 64 Lamps | Section 66 Lamps |
|---|---|---|
| R – 24 sec. on full heat (2200°F) | R – 3 sec. on full heat (4200°F) | R – 15 sec. on full heat (4200°F) |
| 36 sec. off no heat | 57 sec. on ½ heat (2100°F) | 45 sec. on ½ heat (2100°F) |
| C – 24 sec. on full heat (2200°F) | C – 36 sec. on full heat (4200°F) | C – 36 sec. on full heat (4200°F) |
| 36 sec. off no heat | 24 se. on ½ heat (2100°F) | 24 sec. on ½ heat (2100°F) |

It is to be understood that the above Example F setting forth cooking cycles in each heating section is given only for purposes of illustrating the principles of the invention wherein the casing meat products are subjected to an initial low average heating period followed by a higher average heating period, and wherein the product inside and outside temperatures are maintained in proper relationship during the heating periods to maintain the product temperature below the fat melting point. Thus, instead of the fully on - one-half off heating cycle in sections 64, 66, other equivalent average heating cycles can be utilized in accordance with the teachings herein wherein the proper inside - outside product temperatures are maintained so as to prevent the previously mentioned problems of emulsion or product break down, case hardening, casing breakage, etc. Also, properly cycled infrared lamps could be utilized in section 62, instead of the infrared tubes, or in the alternative the tubes can be interchanged with lamps with proper cycling under the teachings herein.

It is to be understood that variations of the described methods and apparatus herein can be made and are within the teachings of the present invention. As an example, any of the various types of casings can be utilized, that is, cellulose, natural or the newer types of edible casings such as made from collagen or seaweed. In addition, the color of the casing may be chosen to enhance the absorption rate of infrared energy. That is, a dark colored casing can be used to possibly hasten the cooking time. Similarly, instead of adding the natural smoke flavor when the product is chopped, mixed or blended, the casing can be soaked and/or flushed with a solution of 1 part natural smoke flavor to 3 parts water. Alternatively, after the casings are stuffed with the emulsion, they can be sprayed or submerged with a solution of 1 part natural smoke flavor, 1 part vinegar, 3 parts water. The product can also be prepared in a loaf mold made of stainless steel, plastic or similar type material, and cooked with intense infrared heat.

It is to be further understood that while there has been illustrated and described herein the rapid turning on and off of an infrared heat source to apply the infrared heat radiation in a controlled impulse manner, other embodiments are obvious in view of the teachings of this invention. One can, for instance, provide such controlled impulse intense infrared heat application by allowing an oscillating object between the product and a continuously on infrared source to cyclically block or reduce the infrared radiation from the source. The oscillating object would oscillate in such a manner that bologna, for instance, would be cyclically shielded or partially shielded from the radiation of 10 seconds and unshielded for 5 seconds. In the alternative, a shield could be rapidly moved into an intermediate position between the constant heat source and the product, maintained in this position for the off or low heat level period, and then rapidly removed for the duration corresponding to the on or high heat level period.

Of course, it is well within the art for one to readily utilize the teachings of this invention in the controlled impulse application of intense infrared radiation to casing products, in order to prescribe suitable on/off cooking cycle times for other types and sizes of casing products than those specifically here described and shown in the examples. For some products it may be desirable to change the on/off cycle during cooking.

In using various meat formulations with infrared cooking under the principles of the present invention, it has been determined that as previously described the final product has significantly less shrinkage (about 2–5 percent) than when cooked using the conventional smokehouse techniques, wherein the shrinkage is about 10–12 percent. The conventional cooking procedure which results in a high amount of shrinkage requires the origin formulation meat ingredients to contain a significant amount of moisture, or as is common practice, water is added to the meat in order to account for the final shrinkage. Because of the significantly less shrinkage, more saleable product is obtained utilizing the present invention than in conventional smokehouse processing.

As an example, starting with an initial formulation of 991 pounds containing 160 pounds water, 919 pounds of saleable product was obtained using the infrared cooking procedure as in Example F. This compared to 900 pounds of saleable product from a standard initial formulation of 1,041 pounds containing 210 pounds water utilizing the conventional smokehouse.

Furthermore, by not having the product subjected to the high shrink, one can use less expensive type meats. In using more collagen protein materials and less of the myosin protein red meats, one is able to reduce the product's manufacturing cost and not alter the primary characteristics of the finished product.

The foregoing detailed description has been given for clearness of understanding only, and no unnecessary limitations should be understood therefrom, as modifications will be obvious to those skilled in the art.

What is claimed is:

1. A method for cooking emulsion meat products containing fat and confined in a casing, said method utilizing infrared radiation and comprising cyclically applying said infrared radiation in controlled impulses for a period of from about 12 to about 195 minutes during which the temperature of said product is increased to from about 152°F. to about 195°F. and maintained below the fat melting point to cook said product without rendering any appreciable amount of fat.

2. A method for cooking emulsion meat products confined in a casing utilizing infrared radiation, said method comprising cycle heating of said products by cyclically applying a first low average level of said infrared radiation to said product for an initial heating period, increasing and maintaining the inside temperature of said product in phase with the product outer surface temperature sufficient to prevent emulsion breakdown in continued cooking of said product, and cyclically applying a second higher average level of said infrared radiation to said product for a subsequent heating period, increasing and maintaining the product inside temperature in phase with the product outer surface temperature, until the required inside temperature of from about 152°F. to about 195°F. of a fully cooked product is obtained, the cyclic application being applied for a total period of time of from about 12 to about 195 minutes.

3. The method of claim 2, wherein during the cyclical application of said first low average level and second higher average level of infrared radiation, the amplitude of said infrared radiation is cyclically varied between maximum and minimum applied radiation levels.

4. The method of claim 2, wherein during the cyclical application of said first low average level and second higher average level of infrared radiation, the temperature of said product is maintained below the melting point of fat to prevent any appreciable amount of fat being rendered.

5. A method of cooking meat food products in casings by the controlled impulse application of intense infrared heat, said method comprising:
 providing a plurality of said intense infrared heat sources in heating proximity to said products; and
 on/off cycle heating of said products to a temperature of from about 152° to about 195°F. in at least two heating periods, wherein in one of said heating periods,
 during said on cycle applying a high amplitude of said infrared heat from said infrared sources to said products; and
 during said off cycle applying a low amplitude of heat from said infrared heat sources to said products;
 said on/off heating cyclically applied to provide a commercially acceptable product in a significantly reduced cooking time of from about 12 to about 195 minutes.

6. A cooked meat emulsion product produced according to the method of claim 1.

* * * * *

UNITED STATES PATENT OFFICE
CERTIFICATE OF CORRECTION

PO-1050 (5/69)

Patent No. 3,713,846        Dated Jan. 30, 1973

Inventor(s) William J. Turner, Wayne E. Henry, Gary W. Hubb

It is certified that error appears in the above-identified patent and that said Letters Patent are hereby corrected as shown below:

Col. 4, line 64, Insert -- a -- after is and before greater;

Col. 8, line 48, "1 1/4" should be -- 4 1/4" --;

Col. 11, line 11 of Table, after 24 "se" should be -- sec --;

Col. 12, line 58, ."origin" should be -- original --.

Signed and sealed this 10th day of July 1973.

(SEAL)
Attest:

EDWARD M. FLETCHER, JR.
Attesting Officer

Rene Tegtmeyer
Acting Commissioner of Patents